United States Patent [19]

Robbins

[11] Patent Number: 4,616,490
[45] Date of Patent: Oct. 14, 1986

[54] LOCKING APPARATUS FOR DISCOURAGING THEFT OF TAPE CASSETTE PLAYERS

[76] Inventor: Leslie D. Robbins, 6325 Arbutus St., Huntington Park, Calif. 90255

[21] Appl. No.: 696,961

[22] Filed: Jan. 31, 1985

[51] Int. Cl.$^4$ ............................................. E05B 73/00
[52] U.S. Cl. ............................................. 70/14; 70/168
[58] Field of Search ...................... 70/14, 57, 58, 163, 70/166, 167, 168, 258; 292/216

[56] References Cited

U.S. PATENT DOCUMENTS

| | | | |
|---|---|---|---|
| 4,131,001 | 12/1978 | Gotto | 70/14 |
| 4,208,837 | 6/1980 | Black | 292/216 |
| 4,527,405 | 7/1985 | Remick | 70/14 |

*Primary Examiner*—Robert L. Wolfe
*Attorney, Agent, or Firm*—Leonard Tachner

[57] ABSTRACT

A tape cassette player locking mechanism which comprises a container of the general configuration of a cassette adapted to be inserted into the player and including a locking mechanism preventing removal of the container without damage to the player. The invention comprises two integral portions, namely, an internal portion that is of dimensions substantially equivalent to the dimensions of a typical tape cassette and is therefore adapted to be inserted into the cassette compartment of a cassette player, and an external portion which is designed to be accessible at the front of the cassette player and which provides a locking device such as a key lock for locking and unlocking the mechanism of the present invention. More specifically, when the internal portion of the present invention has been suitably positioned within the cassette compartment of a tape cassette player and the locking device of the invention, which is accessible from the external portion of the invention, has been actuated to engage the locking mechanism, at least one latch is forced to protrude out of a suitably dimensioned latch window beyond the nominal boundaries of the internal portion of the locking mechanism of the invention. As a result, the latch renders it impossible to remove the tape cassette locking device of the invention without seriously and permanently damaging the cassette player whereby to render it useless and therefore of no value to the thief.

2 Claims, 4 Drawing Figures

LOCKING APPARATUS FOR DISCOURAGING THEFT OF TAPE CASSETTE PLAYERS

BACKGROUND OF THE INVENTION

1. Field of the Invention

The present invention relates generally to security apparatus and more particularly, to a locking apparatus for discouraging the theft of tape cassette players wherever they may be located including in-dashboard mounting in a vehicle such as an automobile, truck, boat, motorcycle, snow mobile, mobile home and the like.

2. Prior Art

The present invention is designed to prevent or at least discourage the theft of tape cassette players by means of a locking mechanism which is designed to be inserted into the cassette compartment of a cassette player whereby the removal of the mechanism cannot be affected without damage to the player unless the mechanism is unlocked prior to its removal.

Applicant knows of only two relevant prior art patents. These are U.S. Pat. No. 3,625,031 to Alley and U.S. Pat. No. 4,248,069 to Burbank. The Alley patent discloses an apparatus for preventing the theft of portable articles from the interior of an automobile but utilizes a flexible elongated cable which has an adjustably sized loop at one end for encircling the steering column and means at the other end of the cable for engaging the portable article. The Burbank patent discloses an apparatus for preventing theft of an in-dashboard mounted radio which includes a backplate which can be mounted across the face of the dashboard by means of the same threaded mounting shaft which is employed for mounting the radio. The backplate is mounted to a cover by means of hinges. The cover can be closed and locked to prevent access to the radio or opened and unhinged if desired to provide encumbered access to the radio. Neither of the aforementioned prior art patents nor any other prior art known to the applicant, discloses the general concept of a locking mechanism that is designed to be inserted into the cassette compartment of a cassette player to discourage theft thereof. More specifically, the theft is prevented by discouraging the potential thief as a result of the inherent difficulty or impossibility of removing the mechanism from the cassette player without damaging the player unless the locking mechanism is properly unlocked prior to the removal.

SUMMARY OF THE INVENTION

The present invention comprises an audio cassette player locking mechanism which consists of a container of the general configuration of a cassette adapted to be inserted into the player and including a locking mechanism preventing removal of the container without damage to the player. The invention consists of two integral portions, namely, an internal portion that is of dimensions substantially equivalent to the dimensions of a typical audio cassette and is therefore adapted to be inserted into the cassette compartment of a cassette player, and an external portion which is designed to be accessible at the front of the cassette player and which provides a locking device such as a key lock for locking and unlocking the mechanism of the present invention. More specifically, when the internal portion of the present invention has been suitably positioned within the cassette compartment of an audio cassette player and the locking device of the invention which is accessible from the external portion of the invention has been actuated to engage the locking mechanism, at least one latch is forced to protrude out of a suitably dimensioned latch window beyond the nominal boundaries of the internal portion of the locking mechanism of the invention. As a result, the latch renders it impossible to remove the audio cassette locking device of the invention without seriously and permanently damaging the audio cassette player whereby to render it useless and therefore of no value to the thief.

In one particular embodiment disclosed herein, two such latches are provided, one each on the opposing surfaces of the internal portion of the invention and a novel latch actuator is disclosed which permits deployment of one or both latches depending upon the nature of the internal structure of the tape cassette player immediately adjacent the locking mechanism. The novel latch actuator of the present invention is designed to deploy both latches at all times except when one latch is blocked by surrounding structure whereby only the unblocked latch may be deployed. In such circumstances, the latch actuator of the invention is designed to extend the remaining latch beyond the nominal extension point to which it would ordinarily be deployed if both latches were extended. The invention is not designed to prevent removal of the cassette player, but is designed to discourage theft by rendering the device useless because the locking mechanism would prevent use of the tape cassette player unless it is removed and cannot be removed without seriously and permanently damaging the cassette player. Although the present invention is likely to find most frequent use for protection of audio cassette players, it would be equally useful with video cassette players.

OBJECTS OF THE INVENTION

It is therefore a principal object of the present invention to substantially reduce or entirely overcome the noted disadvantages of the prior art, namely, the failure of the prior art to disclose a device which prevents unauthorized use of a tape cassette player.

It is an additional object of the present invention to provide a tape cassette locking device comprising at least one portion that is designed to be inserted into the cassette compartment of a tape cassette player and when in the locked position, be latched therein whereby removal of the locking mechanism without unlocking the mechanism will cause serious and permanent damage to the cassette player.

It is still an additional object of the present invention to provide a tape cassette locking device which comprises at least an internal portion designed to be inserted into the cassette compartment of a tape cassette player and has at least one latch which is adapted to protrude beyond the nominal boundaries of the internal portion of the device whereby to engage internal structure of the cassette player at all times while the locking mechanism is engaged and to return to its non-protruding position when the locking mechanism is disengaged whereby to allow the user to readily remove the locking device from the cassette player.

It is still an additional object of the present invention to provide a tape cassette locking device which includes an internal portion adapted to be inserted within the cassette compartment of a cassette player and comprising two opposing latches and means for engaging both latches to prevent unauthorized removal of the locking device, but also to adapt to the surrounding structure of the cassette compartment by alternatively engaging only one latch if engagement of the other latch is restricted by the internal structure of the cassette player.

BRIEF DESCRIPTION OF THE DRAWINGS

The aforementioned objects and advantages of the present invention will be more fully understood hereinafter as a result of a detailed description of a preferred embodiment of the invention when taken in conjunction with the accompanying drawings in which.

DETAILED DESCRIPTION OF THE PREFERRED EMBODIMENT

Figure 1:
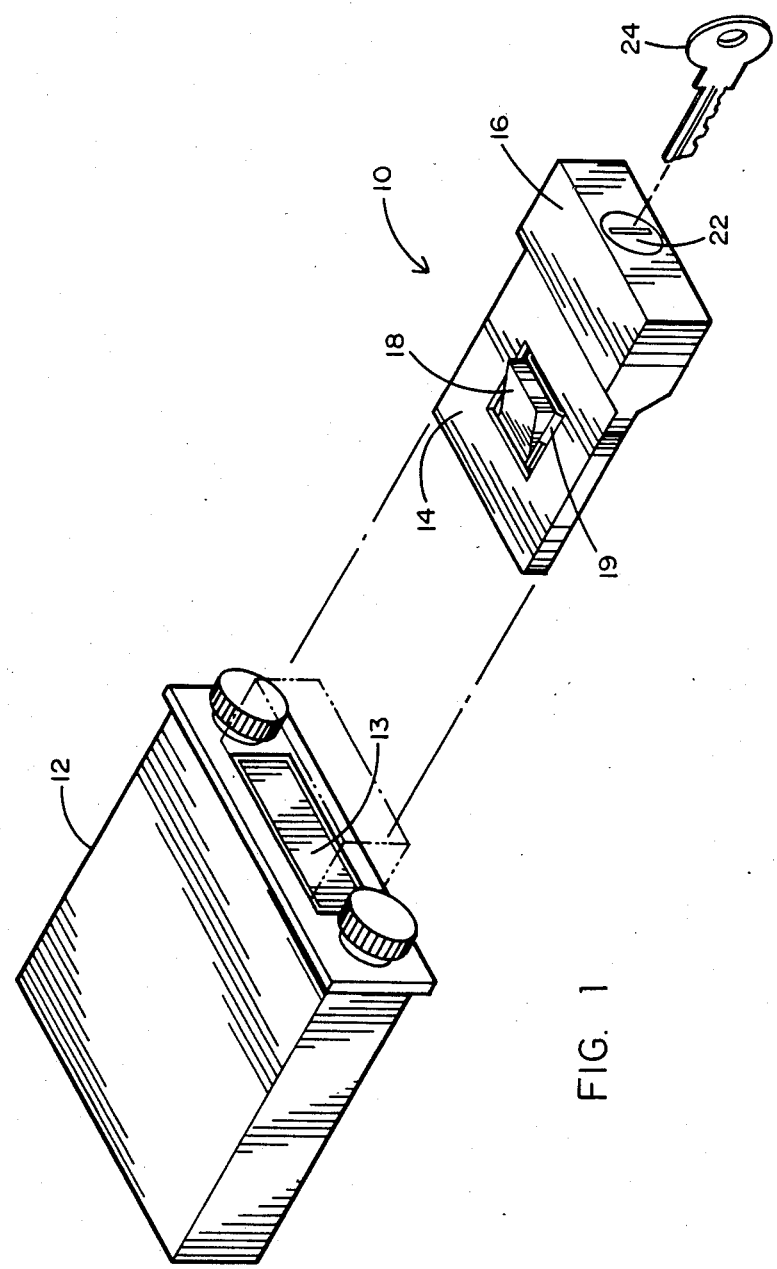
FIG. 1 is a three dimensional view of the tape cassette locking device of the present invention illustrating the manner in which it may be used in conjunction with a tape cassette player for discouraging unauthorized removal thereof.

Referring first to FIG. 1 it will be seen that the tape cassette locking device 10 of the present invention may be adapted to be used in conjunction with a standard audio cassette player 12 of the type having a cassette compartment 13 adapted to receive standard size conventional audio cassettes. Of course, the invention may readily be configured for use in video cassette recorders as well. The locking device 10 comprises an internal portion 14 and an external portion 16. The internal portion 14 is dimensioned substantially equivalent to a standard cassette whereby to permit insertion of the locking device and particularly the internal portion thereof into the cassette compartment 13 of the audio cassette player 12. The external portion 16 of the invention is as shown in FIG. 1, designed to extend from the exterior of the compartment 13 and provide accessibility to a key lock 22 by means of a key 24. Of course, it will be understood hereinafter that the particular locking mechanism of the invention may be many other forms of locking devices such as combination locks and key lock devices with substantially different types of mechanisms. As seen further in FIG. 1, the internal portion 14 of the invention includes at least one latch 18, a portion of which extends beyond a latch window 19 in a surface of the internal portion 14 of the locking device 10.

It will be understood, particularly as a result of the detailed description hereinafter provided in conjunction with FIGS. 2-4, that the latch 18 is designed to be deployed or extended beyond the nominal surfaces of the internal portion 14 of the invention whereby to engage internal structure within the cassette 13 of cassette player 12 whereby to render it impossible or at least extremely difficult to remove the locking device from the cassette player without causing serious and permanent damage to the cassette player. Such damage to the cassette player would discourage theft thereof inasmuch as the locking device would render the cassette player useless unless it were removed and render removal impossible or at least extremely difficult without damaging the player, thereby additionally rendering the player useless.

A detailed description of the manner in which the locking mechanism of the invention deploys latches for the purposes hereinabove described, will now be provided in conjunction with FIGS. 2-4. More specifically, referring to those figures it will be seen that the key lock 22 of the invention is connected to a latch actuator 26 which comprises an elongated extension member 28 and a shorter contact member 30. Extension member 28 and contact member 30 are joined by a fastening element 32 to permit limited rotation of contact member 30 about fastening element 32 for purposes to be discussed hereinafter.

Figure 2:
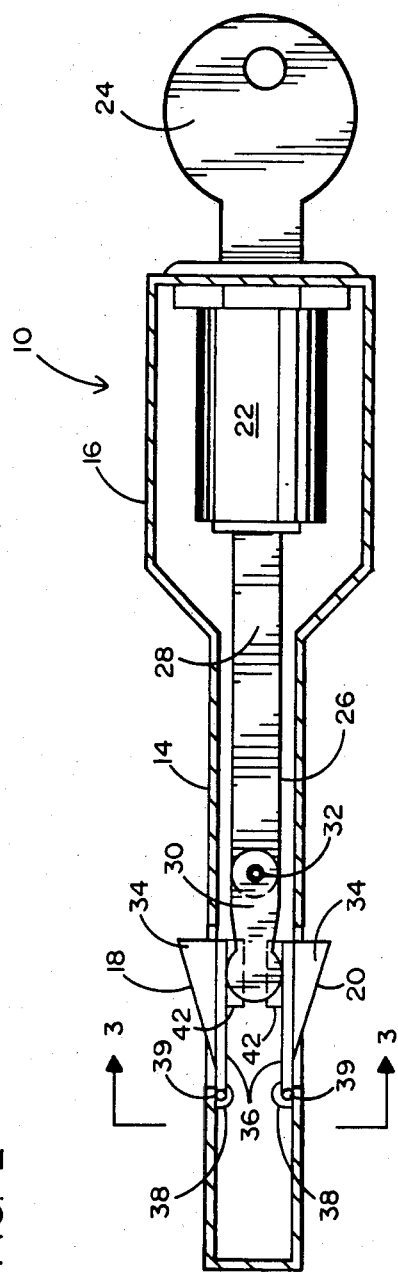
FIG. 2 is a cross-sectional side view of the invention illustrating the internal structure thereof.

As seen further in FIG. 2, the contact member 30 is shown engaging a pair of latches 18 and 20 each of which comprises a blocking member 34 integral with or otherwise affixed to a corresponding swing plate 36. Each such swing plate 36 is anchored to the interior of the housing of the internal portion 14 by an anchor 38 in a manner which permits partial rotation of the swing plate about the anchor at a fulcrum point 39 by a suitable fastening means.

Figure 3:
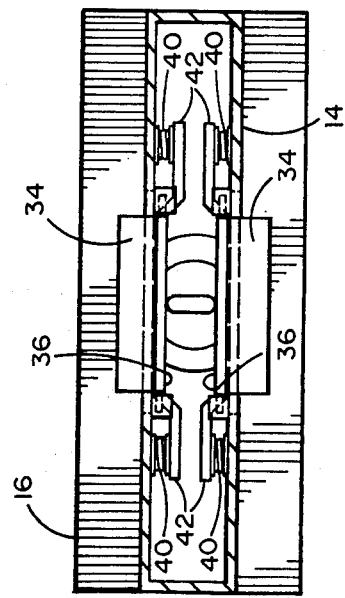
FIG. 3 is a cross-sectional rear view of the invention taken along lines 3—3 of FIG. 2 and further illustrating the internal structure of the invention.

As seen best in FIG. 3, each swing plate 36 comprises a pair of wing members 42 which are adapted to overlie and engage corresponding springs 40, each of which is shown in its fully compressed state in FIG. 3. Clearly, the extension member 28 is shown in FIGS. 2-4 in its locked position wherein this relatively flat rod has been turned by actuating key lock 22 so that contact member 30 engages the inner surface of swing plates 36 whereby to force blocking members 34 beyond the outer perimeter of windows 19 whereby to engage the adjacent structure within compartment 13. Furthermore, it is seen particularly in FIG. 3, that when contact member 30 is so positioned, the wing members 42 of the respective swing plates 36 compress springs 40 whereby springs 40 exert an oppositely directed force on the respective latches 18 and 20. As a result, when key lock 22 is disengaged, thereby turning latch actuator 26 ninety degrees, contact member 30 disengages from swing plates 36 and springs 40 force wing members 42 and therefore swing plates 36 towards one another until the blocking members 34 are retracted internally of internal portion 14 whereby to permit removal of the audio cassette locking device from the audio cassette player.

Figure 4:
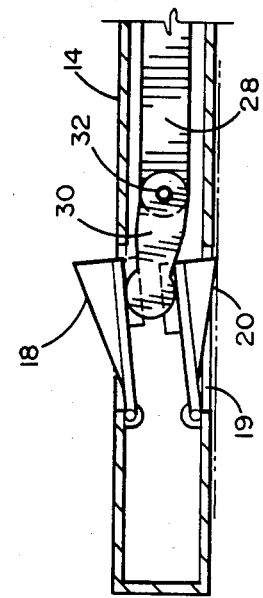
FIG. 4 is a partial cross-sectional side view of the invention illustrating the manner in which it can be adapted to accommodate tape cassette compartments in which the structure adjacent the locking mechanism would otherwise prevent the engagement of one of the two latches of the invention.

As seen in FIG. 4, the illustrated embodiment of the invention comprises an optional feature by virtue of the use of a latch actuator 26 which has an extension member 28 and a contact member 30 interconnected by a fastening element 32 to permit partial rotation of the contact member 30. More specifically, as seen in FIG. 4, if one of the two latches 18 and 20 such as for example, latch 20, is blocked by surrounding structure within the cassette compartment 13 of the player 12 to prevent extension of the blocking member 34 beyond the exterior surface of internal portion 14, then the contact member 30 would rotate counterclockwise as seen in FIG. 4 to force latch 18 (which presumably is unblocked) to protrude beyond window 19 a limited additional amount whereby to maintain the parallel relationship between the swing plates 36 of latches 18 and 20.

It will now be understood that what has been disclosed herein comprises a tape cassette locking device, a portion of which is adapted to be inserted into the cassette compartment of a conventional tape cassette player or player/recorder. The insertable portion comprises at least one latching device which, when engaged by a locking mechanism, protrudes beyond the exterior surface of the internal portion of the locking device whereby to engage surrounding structure within the cassette compartment to prevent removal of the locking device from the cassette player without seriously and permanently damaging the cassette player. As a result, unauthorized use and removal of the cassette player would be discouraged because the player would be unusable with the locking device engaged with the cassette compartment. Furthermore, unauthorized removal of the locking device from the cassette player would be extremely difficult or impossible without seriously and permanently damaging the cassette player, rendering it useless in any case. An external portion of the cassette locking device remains accessible exterior of the cassette compartment whereby to provide access to a locking mechanism such as a key lock or equivalent to permit selective actuation of the latches of the invention whereby to permit insertion, locking, unlocking and removal thereof.

As a result of applicant's teaching herein it will now be apparent to those having skill in the art to which the present invention pertains that various modifications and additions may be made to the invention. By way of example, other locking mechanisms and other latching structures may be readily provided instead of those specifically described herein by way of exemplary embodiment. Therefore, all such modifications and additions are deemed to be within the scope of the invention which is to be limited only by the appended claims.

I claim:

1. A locking device adapted for insertion into the cassette compartment of a tape cassette player, the device comprising:
    an external portion having a locking mechanism accessible when said locking device is inserted into said compartment,
    an internal portion of dimensions substantially equivalent to a tape cassette for insertion into said compartment,
    said internal portion having at least one latch selectively extendable through a window in a surface of said internal portion, said latch being adapted for engaging structure of said player within said compartment adjacent said internal portion, and
    a latch actuator communicating with said locking mechanism and with said latch, said actuator being responsive to said locking mechanism for extending said latch through said window when said locking mechanism is locked and retracting said latch when said locking mechanism is unlocked,
    said latch actuator comprising an elongated rod having a first side and a second side, the first side being greater in width than the second side, said rod being connected to said locking mechanism for rotation upon activation of said locking mechanism whereby either said rod first side or said rod second side is directed toward said latch for selective engagement therewith.

2. A locking device adapted for insertion into the cassette compartment of a tape cassette player, the device comprising:
    an external portion having a locking mechanism accessible when said locking device is inserted into said compartment,
    an internal portion of dimensions substantially equivalent to a tape cassette for insertion into said compartment,
    said internal portion having at least two latches selectively extendable through a window in a surface of said internal portion, said latches being adapted for engaging structure of said player within said compartment adjacent said internal portion,
    a latch actuator communicating with said locking mechanism and with said latches, said actuator being responsive to said locking mechanism for extending said latches through said window when said locking mechanism is locked and retracting said latches when said locking mechanism is unlocked,
    said latches comprising a blocking member affixed to a swing plate, said swing plate being rotatably anchored adjacent said window for selective extension and retraction of said blocking member through said window,
    at least one spring located in relation to said swing plate for resisting said extension of said blocking member and for influencing said retraction of said blocking member, and
    said latches selectively extendable through respective windows on opposing surfaces of said internal portion,
    and wherein said latch actuator cmmprises means for selectively extending both said latches when neither is blocked and one said latch when the other such latch is blocked.

* * * * *